US008254095B2

(12) United States Patent
Carey et al.

(10) Patent No.: US 8,254,095 B2
(45) Date of Patent: Aug. 28, 2012

(54) AUDIO VISUAL ALARM HOUSING

(75) Inventors: Bojana Carey, Elmhurst, IL (US); Curtis Davidson, Oswego, IL (US); Christa Poss, St. Charles, IL (US)

(73) Assignee: Honeywell International Inc., Morristown, NJ (US)

( * ) Notice: Subject to any disclaimer, the term of this patent is extended or adjusted under 35 U.S.C. 154(b) by 247 days.

(21) Appl. No.: 12/834,591

(22) Filed: Jul. 12, 2010

(65) Prior Publication Data

US 2012/0008259 A1 Jan. 12, 2012

(51) Int. Cl.
*G06F 1/16* (2006.01)

(52) U.S. Cl. .............................. 361/679.01; 340/693.12

(58) Field of Classification Search ............. 361/679.01; 340/693.12

See application file for complete search history.

(56) References Cited

U.S. PATENT DOCUMENTS 2,673,270 A * 3/1954 Masaaki ....................... 340/588
5,684,467 A * 11/1997 Hur ........................... 340/693.9
5,805,071 A * 9/1998 Hur ........................... 340/693.9
5,914,665 A * 6/1999 Thorp et al. ............... 340/691.1
5,969,627 A * 10/1999 Tarlton et al. ............ 340/693.12
6,057,778 A * 5/2000 Davidson .................. 340/693.5
6,127,935 A * 10/2000 Davidson et al. .......... 340/691.5
6,133,843 A * 10/2000 Davidson .................. 340/693.9
6,271,763 B1 * 8/2001 Hur .......................... 340/693.12
6,838,997 B1 * 1/2005 Davidson .................. 340/693.9
7,450,026 B2 * 11/2008 Hur et al. .................. 340/693.9
7,817,443 B2 * 10/2010 Hur et al. ...................... 361/822

* cited by examiner

*Primary Examiner* — Lisa Lea Edmonds
(74) *Attorney, Agent, or Firm* — Husch Blackwell LLP

(57) ABSTRACT

An audio visual alarm device that can adapt to a familial look is provided. The audio visual alarm device can include an alarm housing having a footprint of a first shape, and a cover housing having a footprint of a second shape. The alarm housing can include circuitry for operating the audio visual alarm device, and the second shape can be different from the first shape. The cover housing can be configured to accommodate the alarm housing and affix to the alarm housing to give the alarm housing an appearance corresponding to the second shape. At least one portion of the alarm housing can protrude through the cover housing.

20 Claims, 14 Drawing Sheets

THE SQUARE HOUSING SLIDES AND HOOKS ONTO THE MOUNTING PLATE

THE ROUND HOUSING THEN IS PUSHED ONTO THE SQUARE HOUSING AND IS SNAPPED INTO PLACE. THE SCREW IS INSERTED AND SECURES BOTH HOUSINGS TO THE MOUNTING PLATE

AUDIO VISUAL ALARM HOUSING

FIELD OF INVENTION

The present invention relates generally to audio visual alarm housings. More particularly, the present invention relates to audio visual alarm housings that can adapt to a familial look of other alarm housings.

BACKGROUND

Known audio visual alarms can be carried by different types of housings. For example, audio visual alarms can be carried by a square housing or a circular housing.

The different types of housings for audio visual alarms can be mounted on various surfaces. For example, audio visual alarm housings can be mounted on a wall or a ceiling. Often, audio visual alarms with square housings will be mounted on a wall, while audio visual alarms with circular housings will be mounted on a ceiling.

It may be desirable for all audio visual alarm housings in a given environment to have a similar familial appearance. That is, it may be desirable for all alarm housings in a given environment to have either a square or circular appearance. However, it is not desirable to redesign circuitry of existing alarm housings to achieve a familial appearance.

There is thus a continuing, ongoing need for audio visual alarm housings that can adapt to a familial look of other alarm housings. Preferably, the audio visual alarm housings need not be redesigned to adapt to the familial look.

DESCRIPTION OF THE PREFERRED EMBODIMENTS

Figure 1:
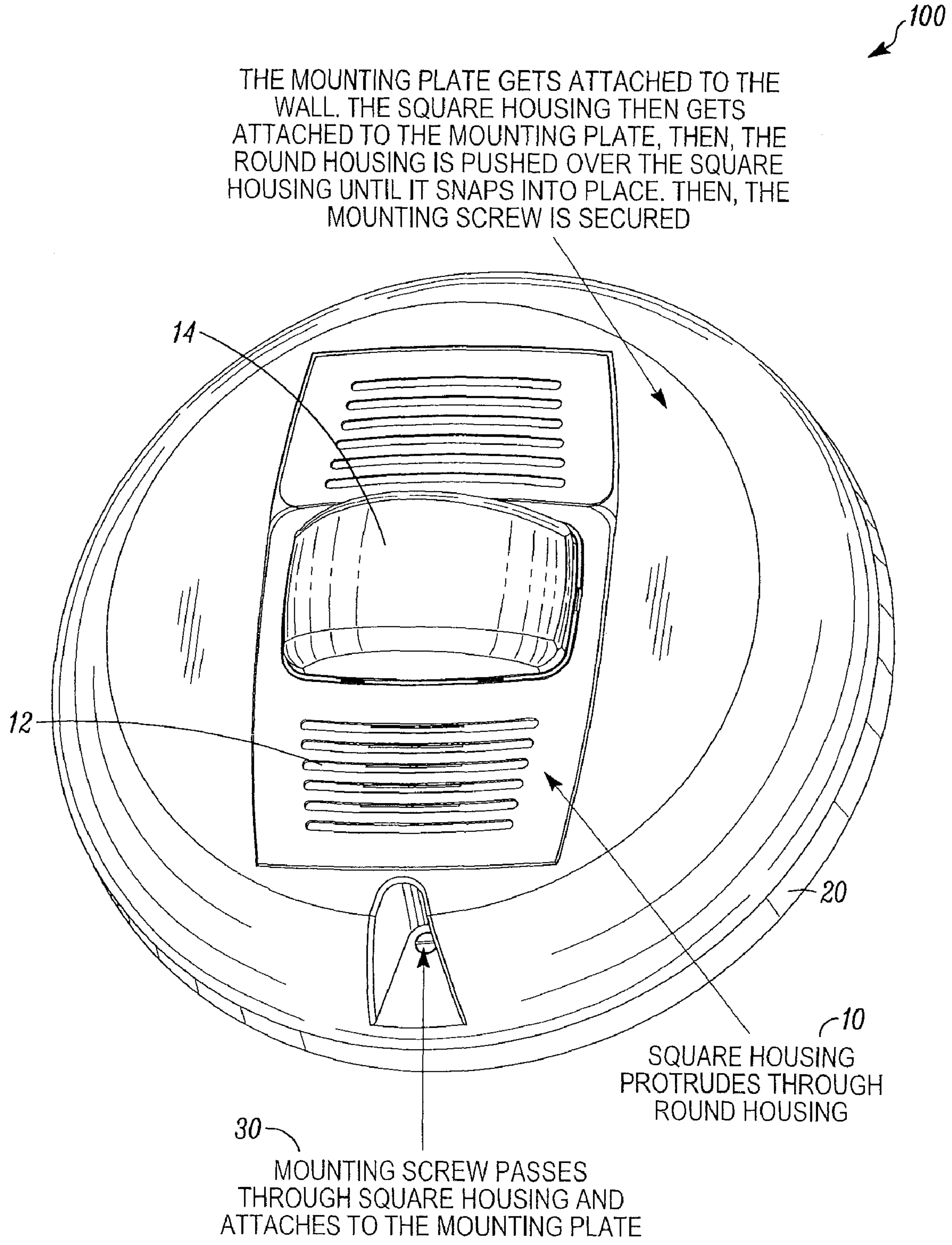
FIG. 1 is a front elevational view of an audio visual alarm housing adapted to a familial look in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention audio visual alarm housings that can adapt to a familial look of other alarm housings. Preferably, the audio visual alarm housings need not be redesigned to adapt to the familial look.

The audio visual alarm housings described herein will be described with reference to a square audio visual housing on a mounting plate and a circular cover housing for affixing to the square alarm housing. However, it is to be understood that any and all shapes of audio visual alarm housings on a mounting plate come within the spirit and scope of the present invention. Further, it is to be understood that any and all shapes of cover housings for affixing to an alarm housing come within the spirit and scope of the present invention.

For example, the audio visual alarm housing on a mounting plate can be rectangular, ovular, or circular. Further, the cover housing for affixing to the alarm housing could be, ovular, square, or rectangular, for example.

FIG. 1 is a front elevational view of an audio visual alarm housing adapted to a familial look 100 in accordance with the present invention. As seen in FIG. 1, a circular housing 20 is affixed a square audio visual alarm housing 10 to adapt the square alarm housing 10 to a familial look of circular housings. Affixing the circular housing 20 to the square alarm housing 10 does not require that the square alarm housing 10 be redesigned. Thus, the internal circuitry of the square alarm housing 10 can be designed and situated as would be typical in known alarm housings.

Figure 2A:
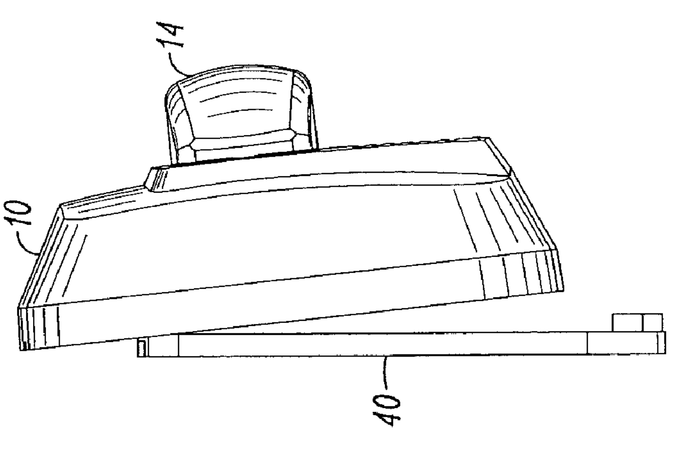
FIG. 2A is a side view of an audio visual alarm housing hooking onto a mounting plate in accordance with the present invention.

A mounting plate as would be known in the art can be attached to a wall or a ceiling, for example. Then, the square alarm housing 10 can be affixed to the mounting plate by any affixing mechanism as would be known in the art. For example, the square alarm housing 10 can be hooked or screwed to the mounting plate. FIG. 2A is a side view of an audio visual alarm housing 10 hooking onto a mounting plate 40 in accordance with the present invention. The alarm housing 10 can be slid relative to the mounting plate 40 to engage corresponding hooks and eyes of the alarm housing and mounting plate.

Figure 2B:
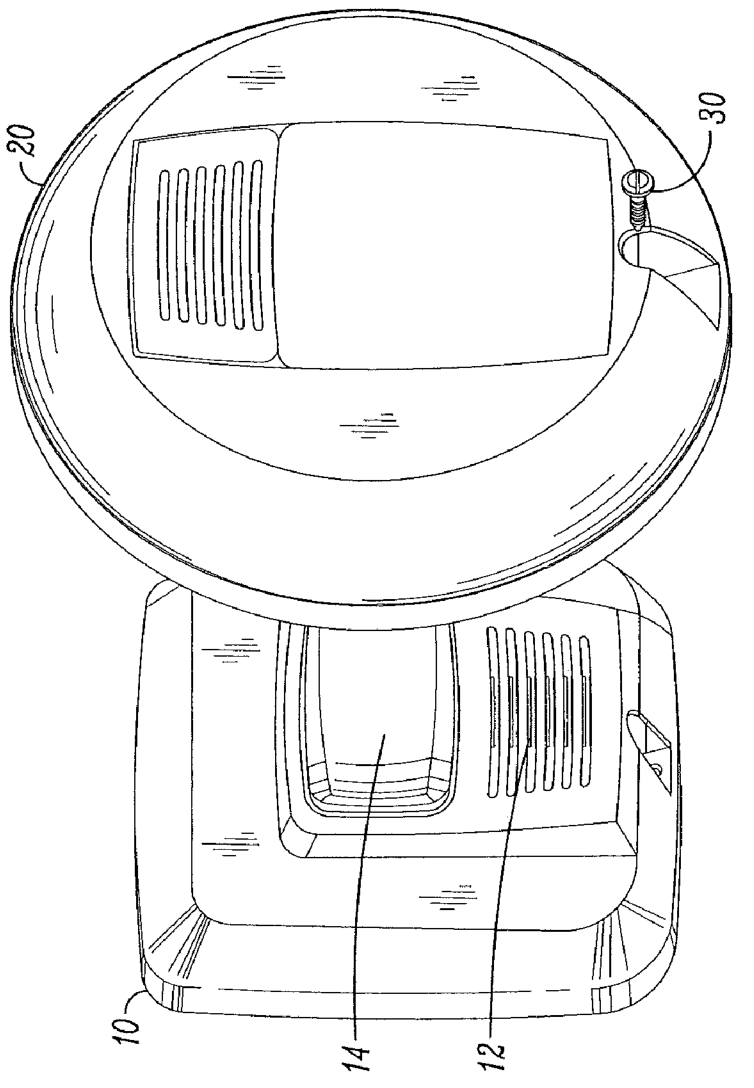
FIG. 2B is a perspective view of a circular housing snapping onto a square audio visual alarm housing in accordance with the present invention.
Figure 3:
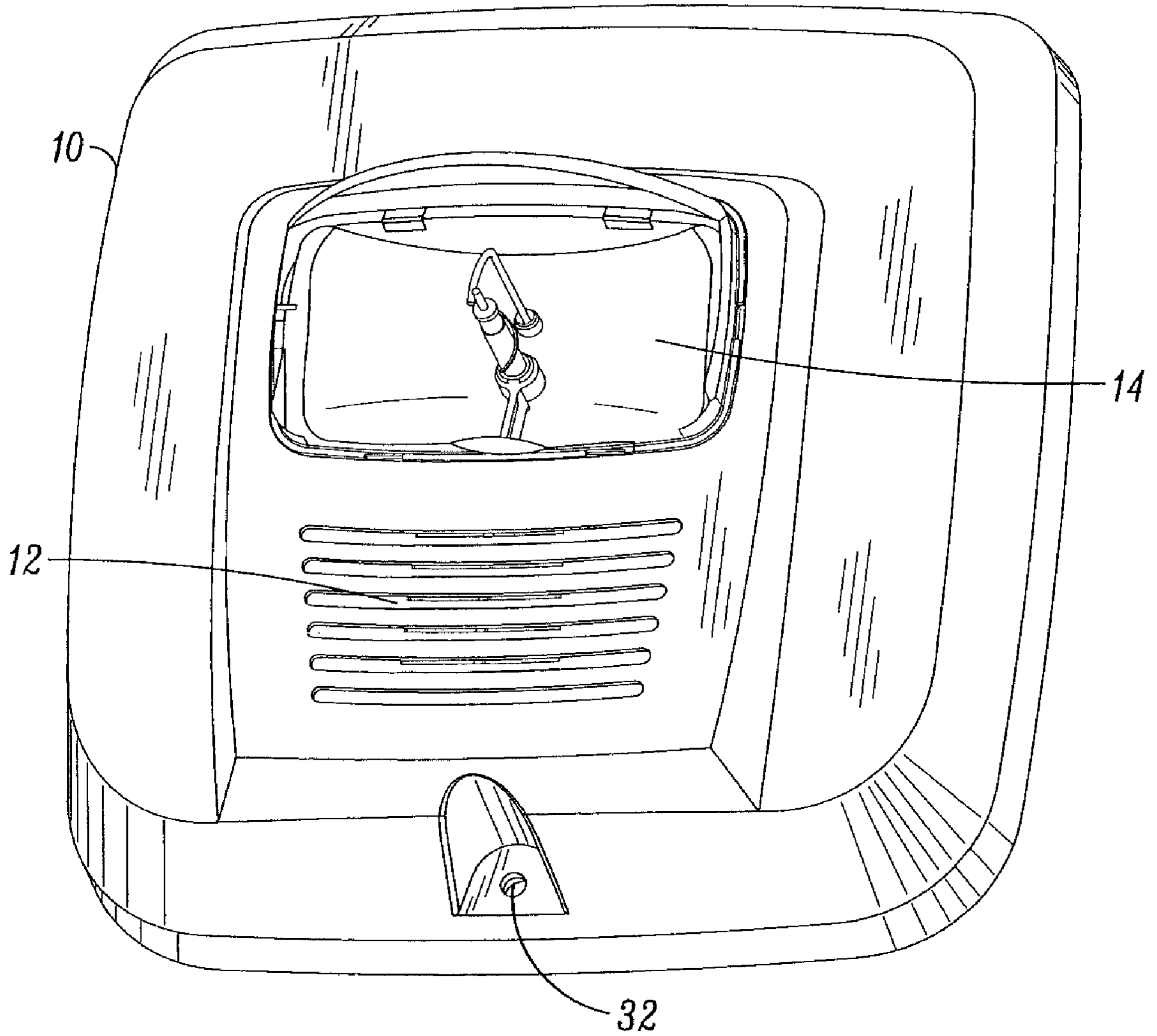
FIG. 3 is a front elevational view of a square audio visual alarm housing in accordance with the present invention.
Figure 4:
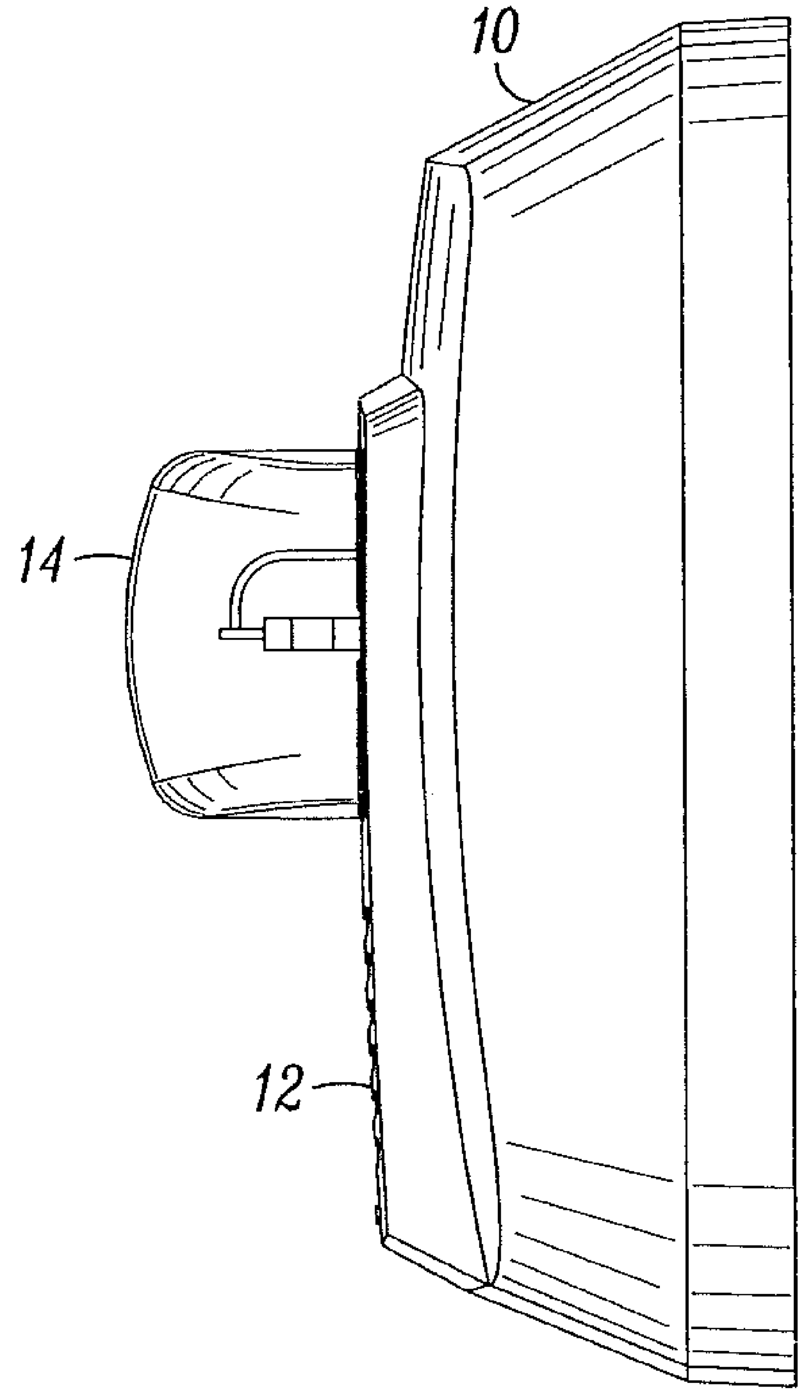
FIG. 4 is a side view of a square audio visual alarm housing in accordance with the present invention.
Figure 5:
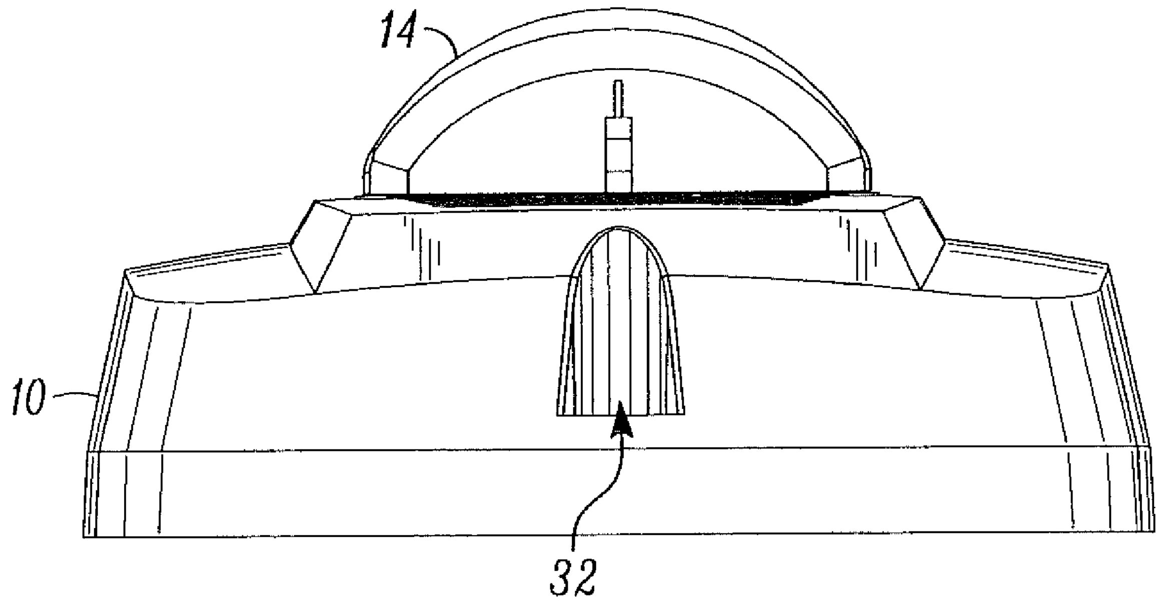
FIG. 5 is a bottom view of a square audio visual alarm housing in accordance with the present invention.
Figure 6:
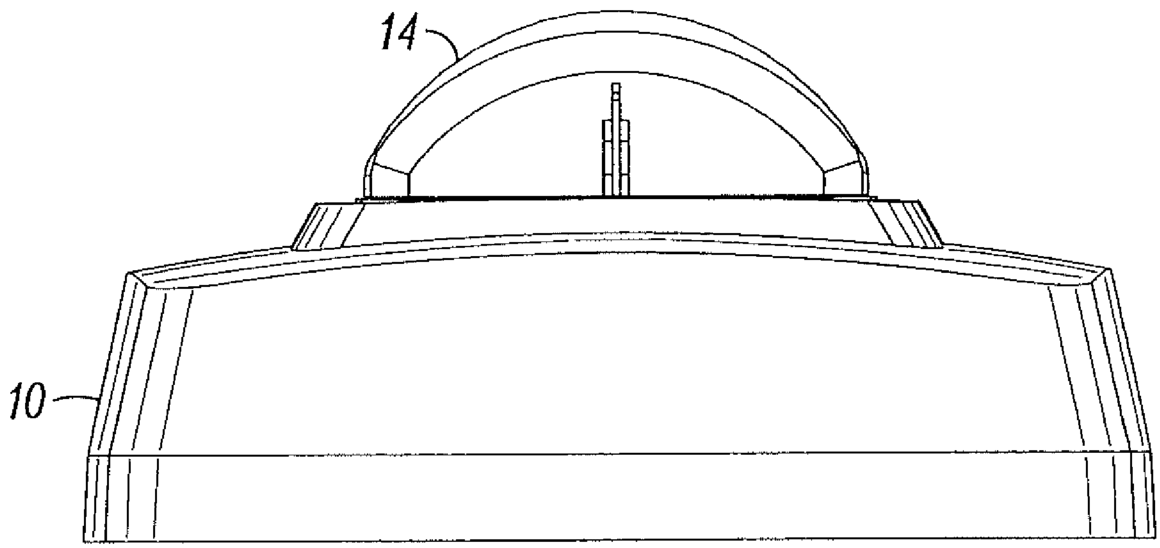
FIG. 6 is a top view of a square audio visual alarm housing in accordance with the present invention.
Figure 7:
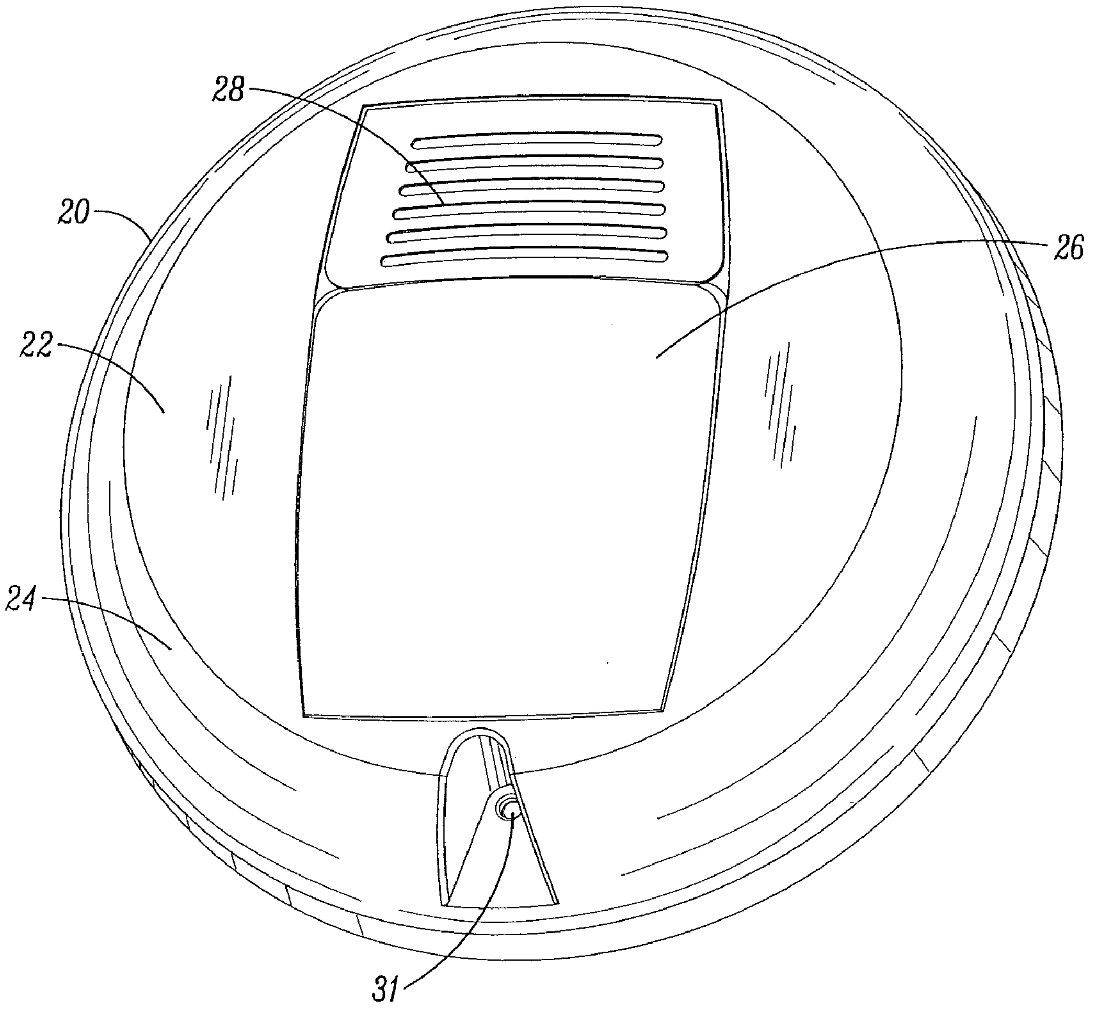
FIG. 7 is a front elevational view of a circular housing in accordance with the present invention.

Once the square alarm housing 10 is affixed to the mounting plate 40, the circular housing 20 can be affixed to the square alarm housing 10. In some embodiments, the circular housing 20 can be snapped onto the square alarm housing 10. FIG. 2B is a perspective view of a circular housing 20 snapping onto a square audio visual alarm housing 10 in accordance with the present invention.

As seen in FIG. 1 and FIG. 2B, the circular housing 20 is shaped so that at least a portion of the square alarm housing 10 protrudes through and/or is visible through the circular housing 20. In embodiments of the present invention, at least audio indicators 12 and/or visual indicators 14 of the square alarm housing 10 protrude through the circular housing 20.

In embodiments of the present invention, and as seen in FIG. 1 and FIG. 2B, at least one mounting screw 30 or any other affixing mechanism as would be known by those in the art can be used to further secure the circular housing 20 in place relative to the square alarm housing 10. The mounting screw 30 can pass through apertures in the circular housing 20 and the square alarm housing 10 and anchor in the mounting plate (not shown).

FIGS. 3-6 are front elevational, side, bottom, and top views, respectively, of a square audio visual alarm housing 10 in accordance with the present invention. As seen in FIGS. 3-6, the alarm housing 10 has a square footprint and includes audio indicators 12 and visual indicators 14. In embodiments of the present invention, the audio indicators 12 include speakers for emitting sound generated by internal circuitry, and the visual indicators 14 include a flashing light that is activated by internal circuitry. The alarm housing 10 also includes an aperture or receptacle 32 for receiving a mounting screw or other affixing mechanism.

FIGS. 7-11 are front elevational, back, side, bottom, and top views of a circular housing 20 in accordance with the present invention. As seen in FIGS. 7-11, the circular housing 20 has a circular footprint and is shaped so that at least a portion of an associated square alarm housing 10 protrudes through and/or is visible through the circular housing 20. The circular housing 20 also includes an aperture or receptacle 31 for receiving a mounting screw or other affixing mechanism.

In embodiments of the present invention, the circular housing includes a flat top portion 22 and an angled side skirt portion 24. The top portion 22 has a circular footprint with a diameter D1. A top end of the angled skirt portion 24 has a circular footprint with a diameter D1, and a bottom end of the angled skirt portion 24 has a circular footprint with a diameter D2. In embodiments of the present invention, D2>D1.

The top portion 22 has an area that is large enough to accommodate an associated square alarm housing 10. The top portion 22 also includes an aperture 26 through which at least a portion of an associated square housing 10 can protrude. In embodiments of the present invention, the top portion 20 also includes an audio indicator 28 for allowing noise emitted from associated alarm to pass therethrough.

Figure 8:
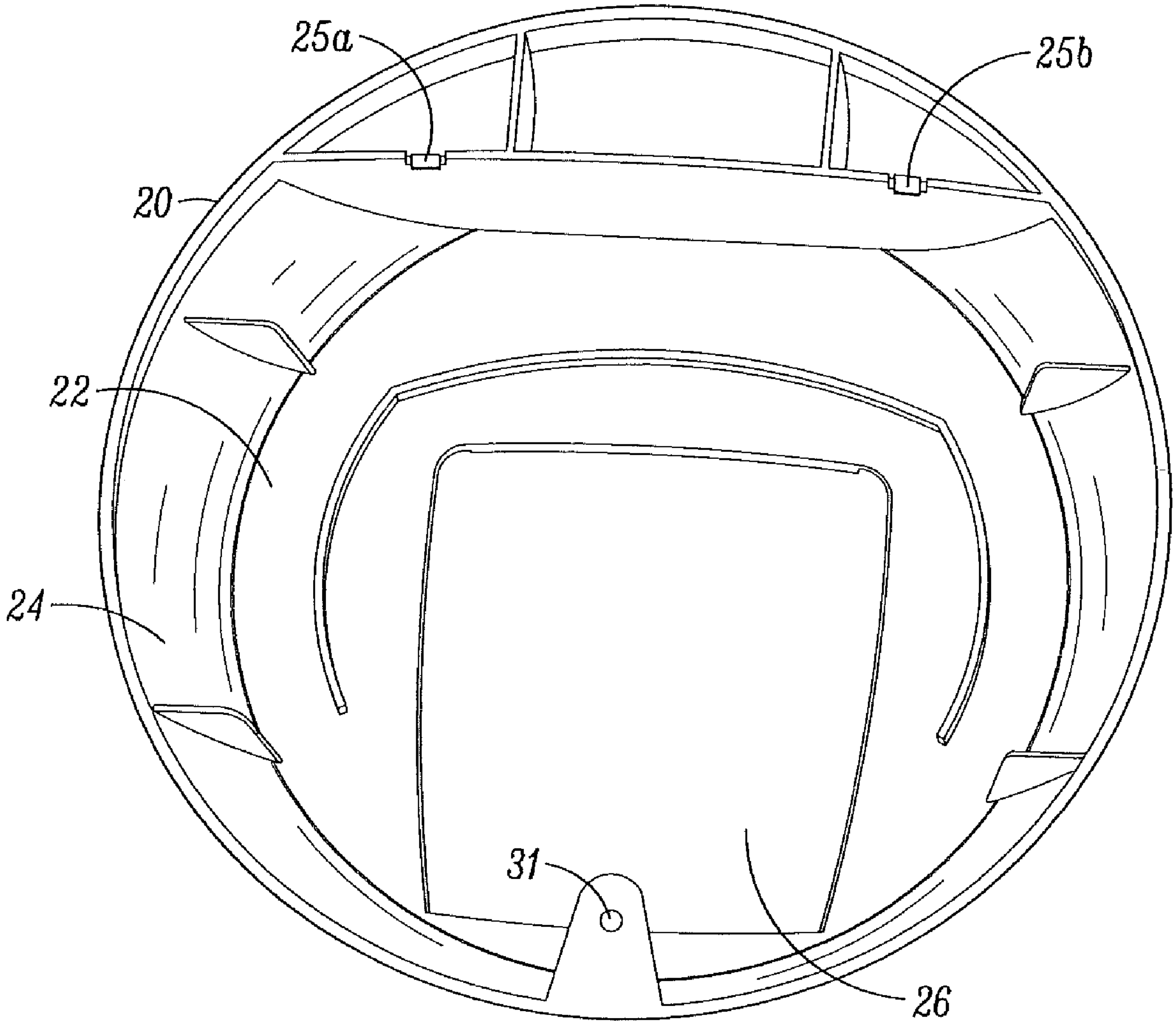
FIG. 8 is a back view of a circular housing in accordance with the present invention.
Figure 9:
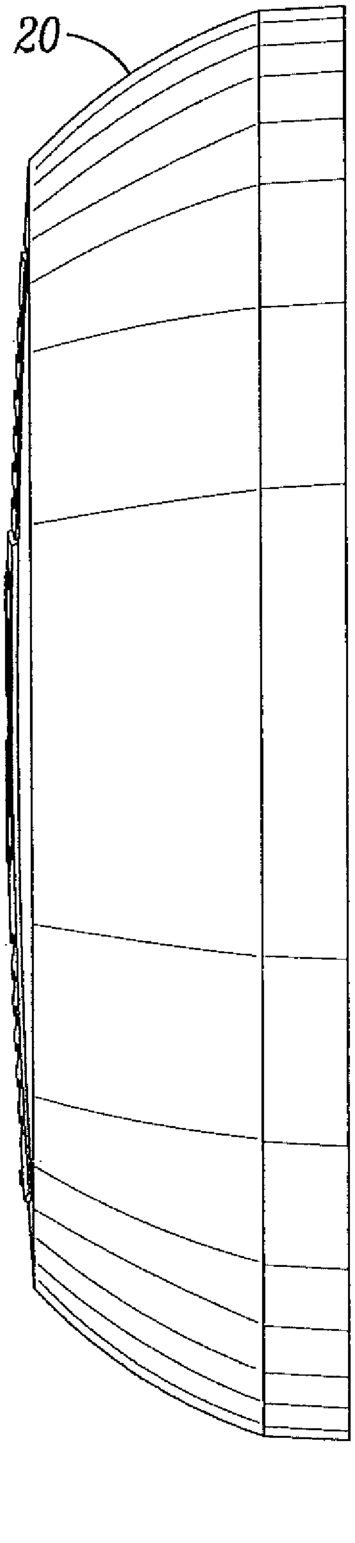
FIG. 9 is a side view of a circular housing in accordance with the present invention.
Figure 10:
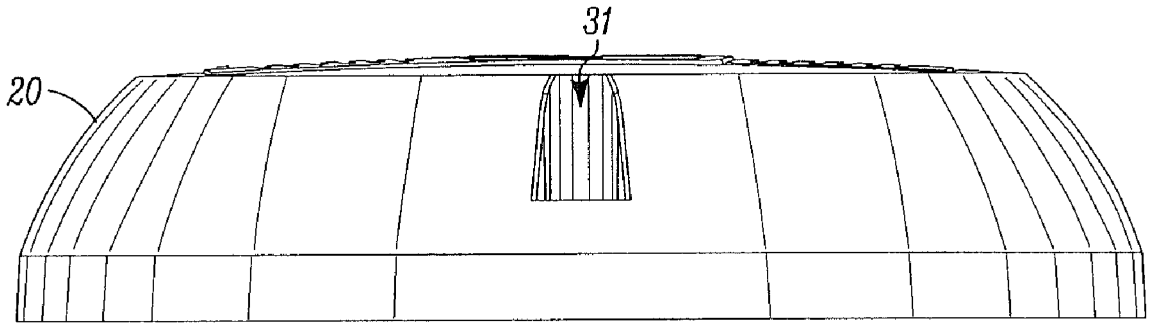
FIG. 10 is a bottom view of a circular housing in accordance with the present invention.
Figure 11:
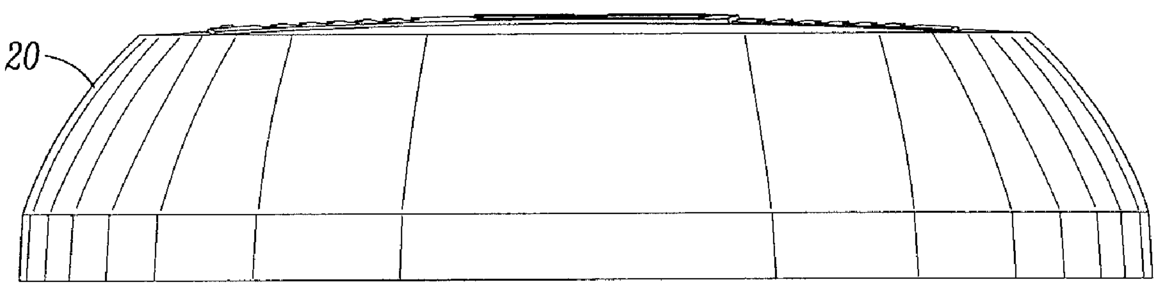
FIG. 11 is a top view of a circular housing in accordance with the present invention.

As seen in FIG. 8, the circular housing 20 can include snaps 25*a* and 25*b* for snapping the circular housing 20 onto an associated square alarm housing. The snaps 25*a* and 25*b* can include protrusions extending from at least a portion of the back of the circular housing 20. In embodiments of the present invention, the circular housing 20 can include one snap or a plurality of snaps.

Figure 12:
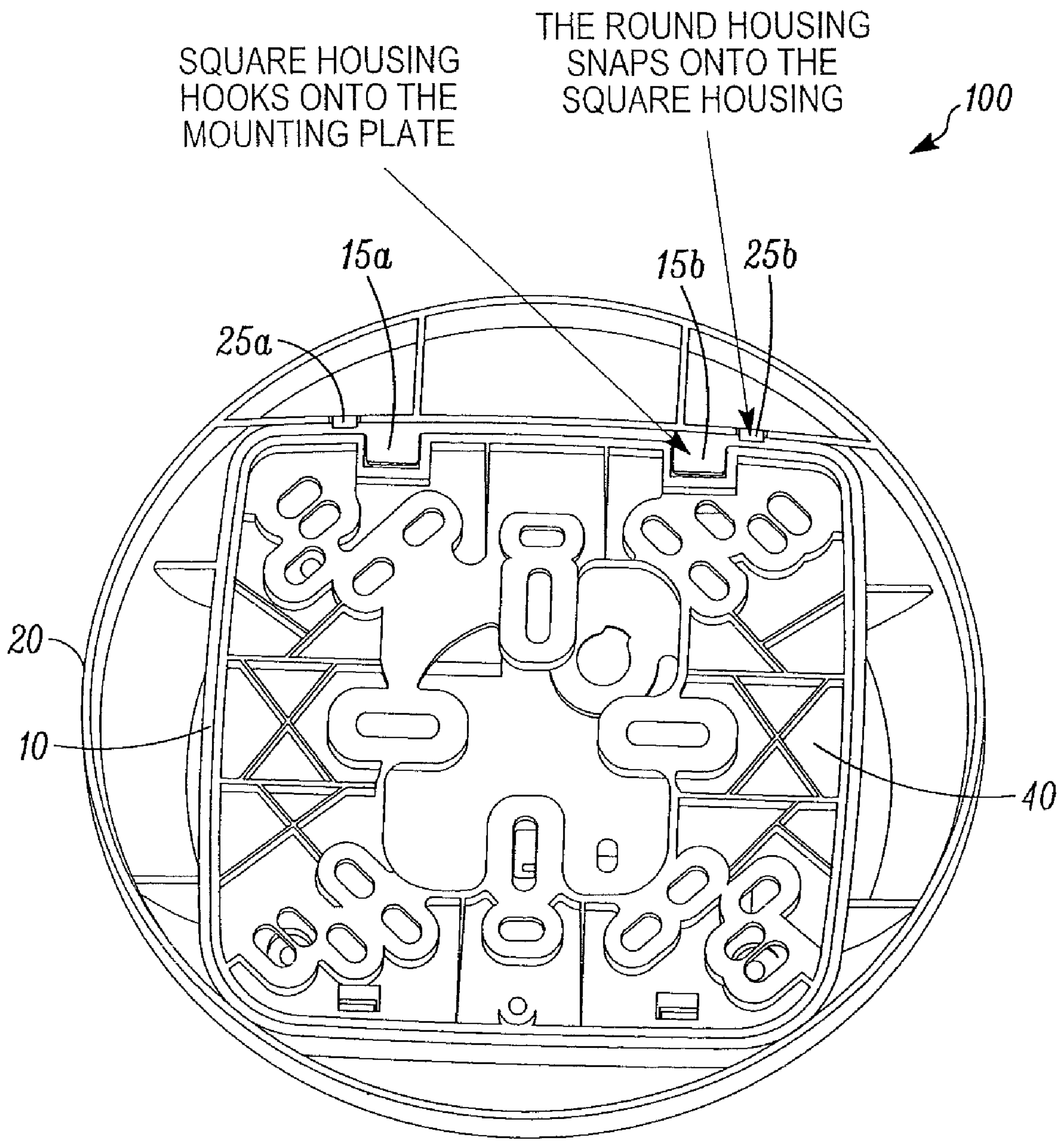
FIG. 12 is a back view of a circular housing snapped onto a square audio visual alarm housing in accordance with the present invention.

FIG. 12 is a back view of a circular housing 20 snapped onto a square audio visual alarm 10 housing in accordance with the present invention. As seen in FIG. 12, the circular housing 20 is large enough to accommodate the associated square alarm housing 10. The square alarm housing 10 includes hooks 15*a* and 15*b* for affixing to a mounting plate 40, and the circular housing 20 includes snaps 25*a* and 25*b* for snapping to the square alarm housing 10.

Figure 13:
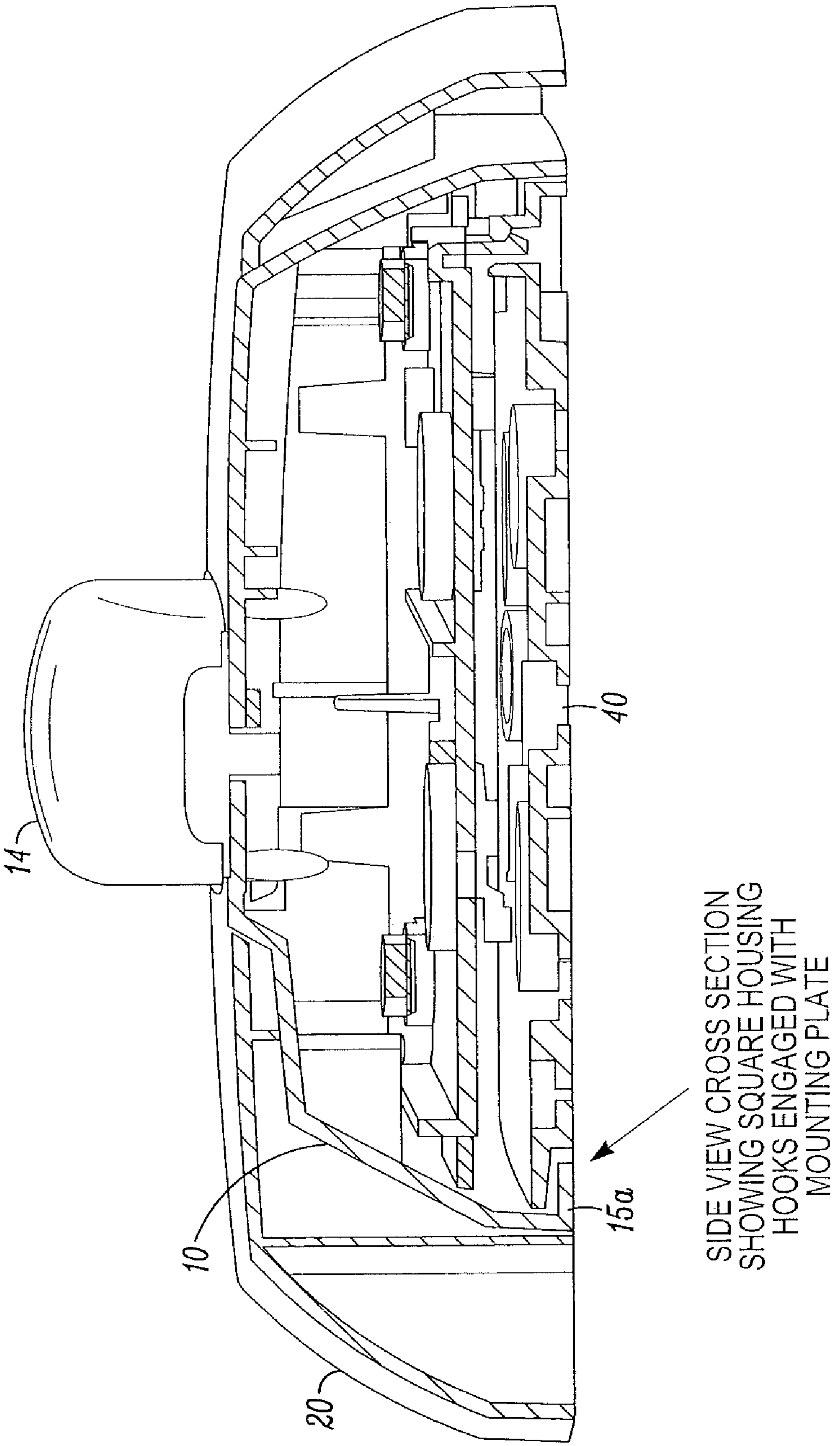
FIG. 13 is a side cross-sectional view of a square audio visual alarm housing hooked onto a mounting plate in accordance with the present invention.

FIG. 13 is a side cross-sectional view of a square audio visual alarm housing 10 hooked onto a mounting plate 40 in accordance with the present invention. As seen in FIG. 13, the square alarm housing 10 can include at least one hook 15*a*, which can include a protrusion extending from at least a portion of the back of the square alarm housing 10. The hook 15*a* can engage with a corresponding groove or eye of the mounting plate 40 to secure the square alarm housing 10 to the mounting plate 40.

Figure 14:
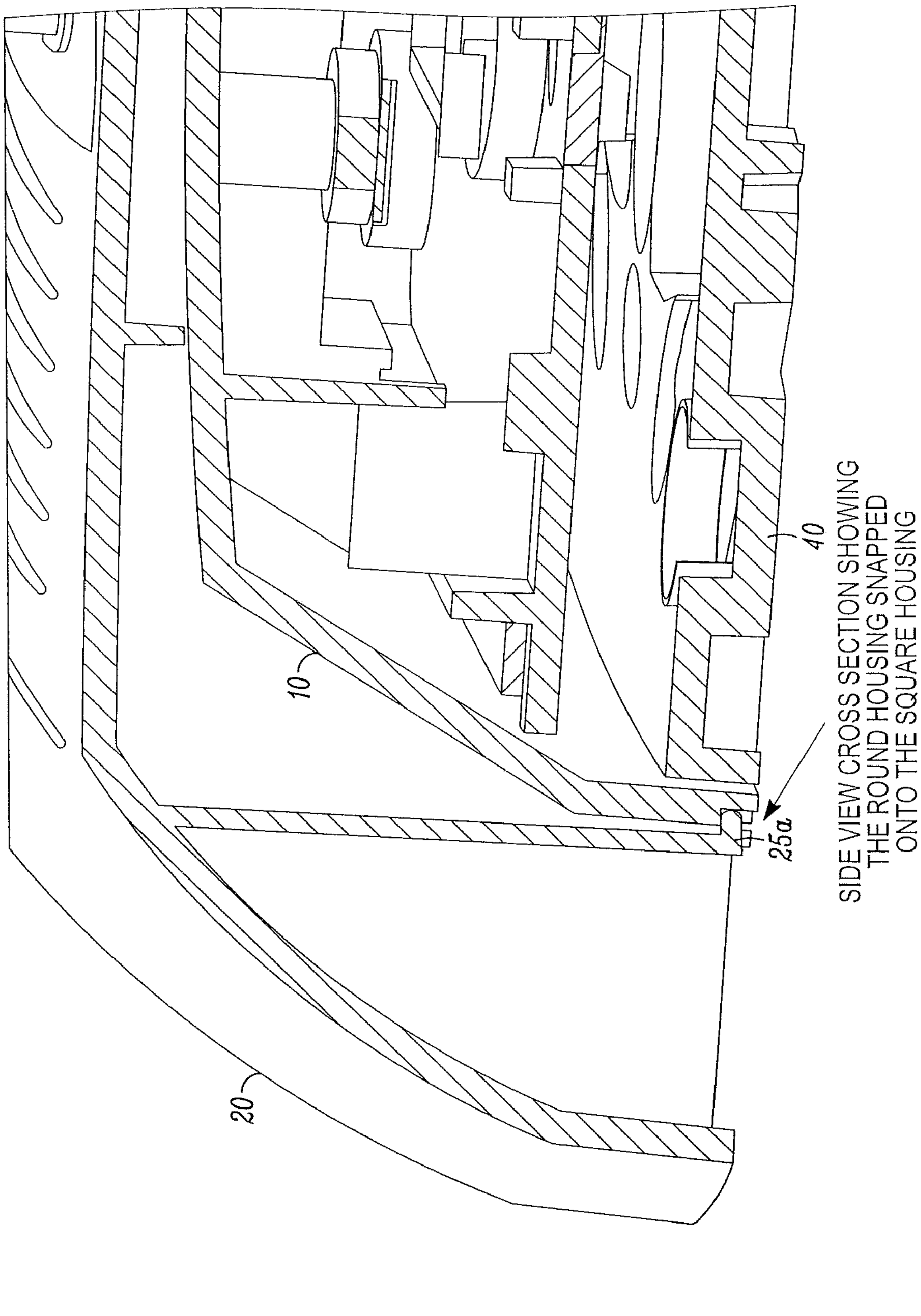
FIG. 14 is a side cross-sectional view of a circular housing snapped onto a square audio visual alarm housing in accordance with the present invention.

FIG. 14 is a side cross-sectional view of a circular housing 20 snapped onto a square audio visual alarm housing 10 in accordance with the present invention. As seen in FIG. 14, the circular housing 20 can include at least one snap 25*a*, which can include a protrusion extending from the back of the circular housing 10. The snap 25*a* can engage with a corresponding recess, groove, receptacle, or edge of the square alarm housing 10 for securing the circular housing 20 to the square alarm housing 10.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. An audio visual alarm device comprising:

an alarm housing having a footprint of a first shape, the alarm housing including circuitry for operating the audio visual alarm device; and a cover housing having a footprint of a second shape, the second shape being different from the first shape;

wherein the cover housing is configured to accommodate the alarm housing and affix to the alarm housing to give the alarm housing an appearance corresponding to the second shape, and wherein at least one portion of the alarm housing protrudes through the cover housing.

2. The audio visual alarm device of claim 1 wherein the first shape is one of square, rectangular, ovular, and circular.

3. The audio visual alarm device of claim 1 wherein the second shape is one of square, rectangular, ovular, and circular.

4. The audio visual alarm device of claim 1 wherein the alarm housing is configured for affixing to a mounting plate.

5. The audio visual alarm device of claim 4 wherein the alarm housing is configured for hooking onto the mounting plate.

6. The audio visual alarm device of claim 5 wherein the alarm housing includes at least one hook for hooking onto the mounting plate.

7. The audio visual alarm device of claim 1 wherein the cover housing is configured to be snapped onto the alarm housing.

8. The audio visual alarm device of claim 7 wherein the cover housing includes at least one snap for snapping onto the alarm housing.

9. The audio visual alarm device of claim 8 wherein the alarm housing includes at least one recess for receiving the at least one snap of the cover housing.

10. The audio visual alarm device of claim 1 further comprising a mounting screw for affixing the cover housing to the alarm housing.

11. The audio visual alarm device of claim 1 wherein the cover housing includes at least one aperture for accommodating the portion of the alarm housing protruding through the cover housing.

12. The audio visual alarm device of claim 1 wherein at least one of an audio indicator and a visual indicator protrude through the cover housing.

13. A cover housing comprising:

a flat top portion having a footprint of a first shape and a first diameter;

a skirt portion, a top end of the skirt portion having a footprint of a first shape and the first diameter, a bottom end of the skirt portion having a footprint of the second shape and a second diameter, the second diameter being larger than the first diameter;

an aperture disposed in the top portion; and at least one snap extending from a back side of the top portion or the skirt portion;

wherein the at least one snap is configured to affix to an alarm housing having a footprint of a second shape, and the aperture is configured to accommodate at least a portion of the alarm housing protruding through the top portion.

14. The cover housing of claim 13 wherein the first shape is one of square, rectangular, ovular, and circular.

15. The cover housing of claim 13 further comprising a receptacle for receiving a mounting screw for affixing the cover housing to the alarm housing.

16. The cover housing of claim 13 further comprising an audio indicator for passing noise therethrough emitted from the alarm housing.

17. The cover housing of claim 13 further comprising a plurality of snaps for affixing the cover housing to the alarm housing.

18. An audio visual alarm comprising:

a housing having a footprint of a first shape;

at least one audio indicator;

at least one visual indicator;

circuitry for determining an alarm condition and activating the audio indicator and the visual indicator; and at least one recess disposed near a back side of the housing;

wherein the recess is configured for receiving a snap of a cover housing having a footprint of a second shape, and the housing is configured for being disposed within the cover housing footprint of the second shape.

19. The audio visual alarm housing of claim 18 wherein the audio indicator and the visual indicator are configured for protruding through the cover housing when the housing is disposed within the cover housing footprint of the second shape.

20. The audio visual alarm housing of claim 18 further comprising at least one hook for affixing the housing to a mounting plate.

* * * * *